(12) United States Patent
Bean et al.

(10) Patent No.: US 11,372,981 B2
(45) Date of Patent: Jun. 28, 2022

(54) PROFILE-BASED MONITORING FOR DUAL REDUNDANT SYSTEMS

(71) Applicant: Rockwell Collins, Inc., Cedar Rapids, IA (US)

(72) Inventors: Reginald D. Bean, Center Point, IA (US); Carl J. Henning, Cedar Rapids, IA (US); Gregory S. Droba, Cedar Rapids, IA (US); Carlen R. Welty, Solon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 317 days.

(21) Appl. No.: 16/738,875

(22) Filed: Jan. 9, 2020

(65) Prior Publication Data

US 2021/0216641 A1    Jul. 15, 2021

(51) Int. Cl.
*G06F 21/00* (2013.01)
*G06F 21/57* (2013.01)
*G06F 21/56* (2013.01)

(52) U.S. Cl.
CPC .......... *G06F 21/577* (2013.01); *G06F 21/566* (2013.01); *G06F 2221/034* (2013.01)

(58) Field of Classification Search
CPC .............. G06F 11/187; G06F 11/3089; G06F 11/0751; G06F 11/3055; G06F 11/1629;
(Continued)

(56) References Cited

U.S. PATENT DOCUMENTS 6,002,970 A    12/1999   Abdelnour et al.
6,035,416 A     3/2000   Abdelnour et al.
(Continued)

FOREIGN PATENT DOCUMENTS

CN    104330721 B    3/2017
CN    104215894 B    4/2017
(Continued)

OTHER PUBLICATIONS

Fujimoto, Daisuke et al., "A Demonstration of a HT-Detection Method Based on Impedance Measurements of the Wiring Around ICs", IEEE Transactions on Circuits and Systems II: Express Briefs, vol. 65, Issue 10, https://ieeexplore.ieee.org/document/8418748, Jul. 24, 2018, Abstract.

*Primary Examiner* — Tri M Tran
(74) *Attorney, Agent, or Firm* — Suiter Swantz pc llo (57) ABSTRACT

A redundant processing system with profile-based monitoring is disclosed. In embodiments, the redundant system includes two or more redundant lanes, each lane having equivalent processing components. In a testing state, template processors and hardware monitoring sensors are connected to a selected trusted lane and input vectors submitted thereto; the hardware sensors characterize the response of the selected lane and the resulting testing data compiled into system templates. In an operational environment, the template processors send challenges based on the input vectors to each of the redundant lanes in real time, collecting response data from each lane via identical sets of monitoring sensors. The template processors correlate the response data with the corresponding system templates, identifying anomalous lanes and system anomalies based on discorrelations between the response data and the system templates.

18 Claims, 6 Drawing Sheets

(58) Field of Classification Search
CPC ............. G06F 21/566; G06F 2221/034; G06F 21/577; G06F 11/3466; G06F 11/3024
See application file for complete search history.

(56) References Cited

U.S. PATENT DOCUMENTS

| | | |
|---|---|---|
| 9,529,035 B2 | 12/2016 | Orozco et al. |
| 9,568,613 B2 | 2/2017 | Droba et al. |
| 2005/0246581 A1 | 11/2005 | Jardine et al. |
| 2012/0116734 A1 | 5/2012 | Infante et al. |
| 2019/0163583 A1* | 5/2019 | Fahim .................. G06F 9/3818 |

FOREIGN PATENT DOCUMENTS

| | | |
|---|---|---|
| CN | 109446848 Z | 3/2019 |
| CN | 109543464 A | 3/2019 |

* cited by examiner

PROFILE-BASED MONITORING FOR DUAL REDUNDANT SYSTEMS

CROSS-REFERENCE TO RELATED APPLICATIONS

The instant application is related to concurrently filed U.S. patent application Ser. No. 16/738,611. Said U.S. patent application Ser. No. 16/738,611 is hereby incorporated by reference in its entirety.

TECHNICAL FIELD

The subject matter disclosed herein is directed generally to remote system testing and more particularly to methods and apparatuses for ensuring trust in high reliability systems.

BACKGROUND

In certified computing environments, and in other high reliability/high availability computing systems, supplemental or augmented hardware may be added to provide system redundancies to improve both reliability and availability, e.g., to ensure the seamless execution of system-critical applications or the rapid detection of errors or anomalies. However, a dual-redundant system wherein the two redundant lanes contradict each other may not be able to easily determine which lane is operating normally and which is operating anomalously or erroneously. A common solution is to introduce a third redundant lane to "break the tie" (e.g., assuming that if two of the three lanes are operating in parallel, the outlier is the anomalous lane), but at the expense of size, weight, and power.

SUMMARY

A redundant system with profile-based monitoring is disclosed. In embodiments, the redundant system has a testing state and a monitoring/operational state and includes two or more redundant (e.g., equivalent) lanes. Each lane includes equivalent processors and hardware components, with equivalent user applications executing on the processors. Each lane includes a set of hardware monitoring sensors in communication with shared template processors. While in the testing state, the template processors submit input vectors to a selected lane and characterize the expected response of the lane by collecting system response data from the hardware sensors. Based on the input vectors and corresponding system response data, the template processors generate system templates characterizing the expected behavior of the lane and of its components. While in the monitoring/operational state, the template processors submit specific commands, command sequences, and other system challenges in real time to each lane, characterizing the system response by collecting monitoring response data via the hardware sensors. The template processors correlate the monitoring response data with the corresponding system templates to identify anomalous behavior or system failure within a particular lane, based on discorrelation between the monitoring response data from that lane and the system templates.

A method for profile-based monitoring is also disclosed. In embodiments, the method includes connecting equivalent sets of hardware monitoring sensors to each equivalent processing lane of a redundant system having two or more such lanes, each lane comprising equivalent sets of processors and hardware components. The method includes connecting each set of hardware monitoring sensors to common template processors. The method includes, while the redundant system is in a testing state, submitting input vectors to a selected test lane via the common template processors. The method includes collecting testing response data characterizing a system response to the submitted input vectors via the set of hardware monitoring sensors. The method includes generating, via the common template processors, system templates characterizing the expected behavior of the test lane and its components, based on the submitted input vectors and corresponding testing response data. The method includes, while the redundant system is a monitoring/operational state, submitting system challenges to each processing lane via the common template processors. The method includes collecting, via each set of hardware monitoring sensors, monitoring response data responsive to the submitted challenges. The method includes identifying, via the common template processors, discorrelations between the collected monitoring response data from a given processing lane and the corresponding system templates (e.g., based on common or similar input vectors). The method involves identifying, via the common template processors, system anomalies associated with the given lane based on the discorrelations.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Figure 1:
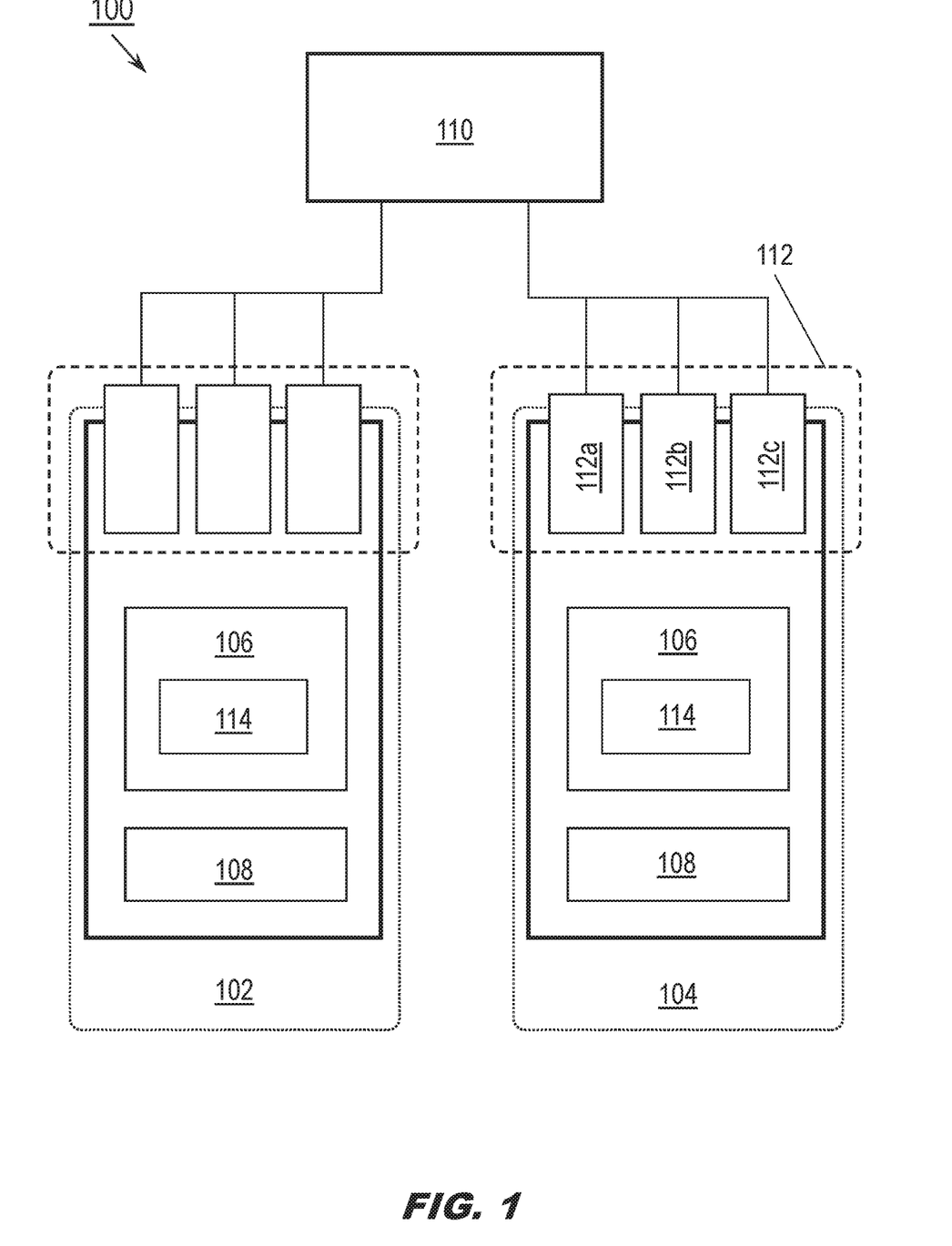
FIG. 1 is a block diagram illustrating a redundant system with profile-based monitoring in accordance with example embodiments of this disclosure.

Referring to FIG. 1, a redundant processing environment 100 is disclosed. The redundant processing environment 100 may include two or more redundant processing lanes 102, 104, each redundant processing lane including processors 106 and/or other hardware components 108. The redundant processing environment 100 may include template processors 110 (e.g., system template processors, template processors), each redundant processing lane 102, 104 connected to the template processors by a redundant set of monitoring sensors 112.

In embodiments, each redundant processing lane 102, 104 may be equivalent or identical with respect to its processors 106 and its hardware components 108 (e.g., circuit boards, peripheral devices). Similarly, each processor 106 (e.g., multicore processor, processing environment) may comprise an identical suite of software applications 114 configured to execute thereon. Accordingly, under nominal conditions each redundant processing lane 102, 104 would be expected to produce identical results given a particular set of inputs. Further, in a trusted system the processors 106, hardware components 108, and software applications 114 of each redundant processing lane 102, 104 would behave, or operate, only as intended based on a particular input.

In embodiments, the template processors 110 and any ancillary components thereof may constitute a verified trusted system (e.g., free of influence from hardware Trojans or other hardware-based malware) capable of trust monitoring throughout the redundant system 100 by serving as a "third vote", or essentially a virtual third lane. Accordingly, the template processors 110 may identify or detect anomalous or erroneous behavior within either redundant processing lane 102, 104. Should the outputs or behaviors of the redundant processing lanes 102, 104 contradict, diverge, or otherwise disagree, the template processors 110 may compare the behavior of both redundant processing lanes with the expected system performance under the same inputs and thereby determine which lane is operating properly and which is operating anomalously. The template processors 110 may detect hardware anomalies by first generating a set of system templates (e.g., system profiles) via detailed observation of how the redundant system 100 responds as intended to a broad variety of possible inputs or challenges. For example, input vectors generated by the template processors 110 may include, e.g., unique stimuli or deterministic system actions based on known system commands or that occur as part of typical system operations.

In embodiments, the template processors 110 may submit the generated input vectors to the selected redundant processing lane 102 and characterize the response/s of the selected redundant processing lane to each input vector (or set thereof) by collecting detailed response data via the set of monitoring sensors 112. For example, the set of monitoring sensors 112 may be identical for each redundant processing lane 102, 104 (e.g., and their outputs equivalent for any given input) and may include, e.g., side channel electromagnetic (EM) emanations sensors 112a, time domain reflectometry (TDR) probes 112b (e.g., contact sensors), side channel magnetic current imagers (MCI) 112c, or other appropriate hardware-level sensors capable of collecting system response data from the processors 106 or hardware components 108.

Figure 2A:
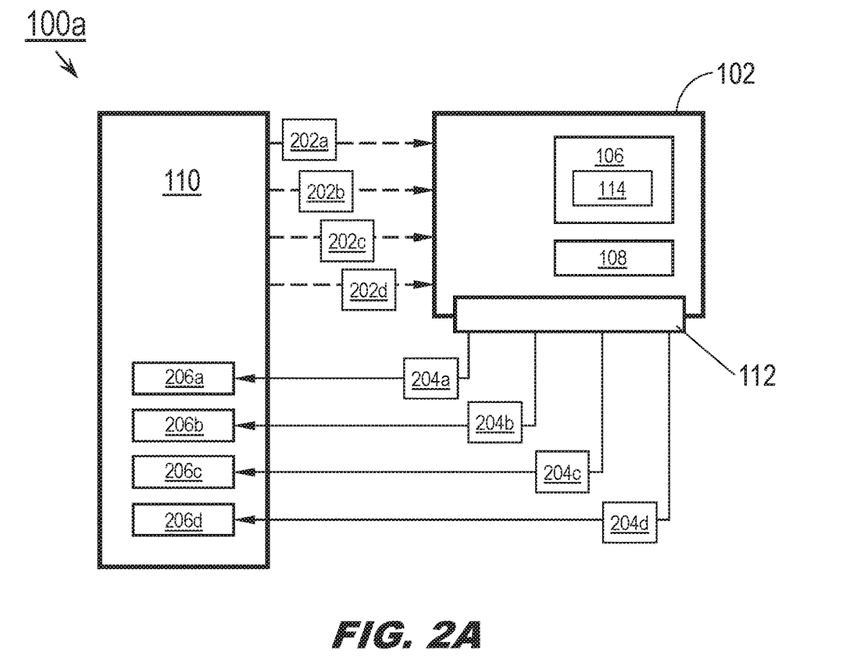
FIGS. 2A through 2D are block diagrams illustrating operations of the redundant system of FIG. 1.

Referring to FIG. 2A, the redundant system 100a may be implemented and may function similarly to the redundant system 100 of FIG. 1, except that the redundant system 100a may have a testing state or phase wherein the template processors 110 select a redundant processing lane 102 (e.g., either or both of the two redundant processing lanes 102, 104) and verify the selected lane as a trusted system, e.g., that the processors 106, hardware components 108, and software applications 114 of the redundant processing lane 102 will behave precisely as intended in response to a given set of inputs. For example, for each input vector or discrete set of input vectors 202 a-d generated by the template processors 110 and submitted to the selected redundant processing lane 102, the monitoring sensors 112 may collect system response data 204a-d and forward the collected system response data to the template processors 110. The template processors 110 may combine the submitted input vectors 202a-d (or discrete sets thereof) with the corresponding profiles of system response data 204a-d generated in response to the submitted input vectors (and collected by the monitoring sensors 112) into a set of system templates 206a-d.

Figure 2B:
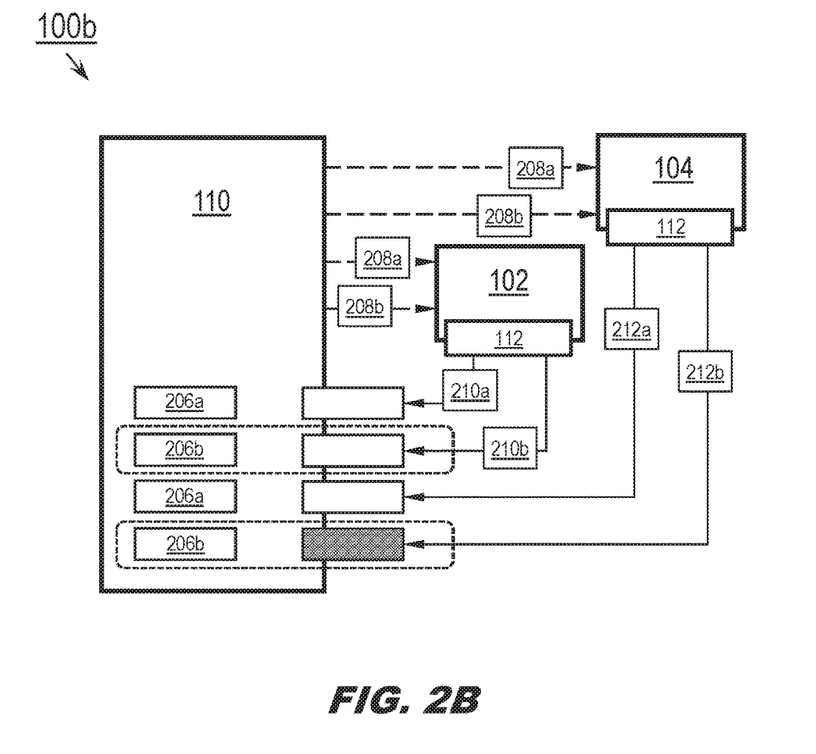

Referring to FIG. 2B, the redundant system 100b may be implemented and may function similarly to the redundant system 100a of FIG. 1, except that the template processors 110 of the redundant system 100b may use the generated system templates 206a-b to monitor each redundant processing lane 102, 104 during normal operational or monitoring states (e.g., as opposed to the testing states or phases described above). For example, when the redundant system 100b is in its operational environment, the template processors 110 may issue challenges 208a-b corresponding to the input vectors (202a-b, FIG. 2A; e.g., the input vectors used in the generation of the system templates 206a-d) in real time to each redundant processing lane 102, 104 and monitor (via the monitoring sensors 112) the response of each redundant processing lane to the challenges 208a-b.

In embodiments, the system response data 210a-b, 212a-b generated by each set of monitoring sensors 112 in response to the challenges 208a-b may be correlated by the template processors 110 with the original system templates 206a-b corresponding to the related input vectors 202a-b or discrete sets thereof. For example, the template processors 110 may submit the challenge 208b to each redundant processing lane 102, 104, and each lane may respond in a divergent or contradictory fashion. The template processors 110 may resolve this divergence by correlating each set of system response data 210b, 212b to its corresponding system template 206b (e.g., the system template 206b, challenge 208b, and both sets of system response data 210b, 212b based on a common input vector 202b). The analytical processing undertaken by the template processors 110 may be similar to that associated with a template attack, but inverted. For example, the challenge 208b may involve a key discoverable via the system template 206b; corresponding traces 210b, 212b collected by each set of monitoring sensors 112 may then be correlated back to the challenge (e.g., the system template 206b based on the response of the trusted processing lane 102 to the input vectors 202b).

In embodiments, if the system response data 210b associated with the redundant processing lane 102 is determined by the template processors 110 to correlate with the corresponding system template 206b, while the system response data 212b associated with the redundant processing lane 104 does not correlate with the system template 206b, the template processors may conclude that the redundant processing lane 102 is operating properly and that one or more system anomalies are present within the redundant processing lane 104. The template processors 110 may designate the redundant processing lane 104 as anomalous upon the determination of anomalous behavior within the said lane.

In some embodiments, the template processors 110 may identify particular system anomalies based on the particular discorrelation between the system response data 212b and the corresponding system template 206b. For example, the template processors 110 may determine that the processors (106, FIG. 2A) or a particular processing component (108, FIG. 2A) of the redundant processing lane 104 is experiencing a local failure or is influenced by malware, or that one or more user applications (114, FIG. 2A) executing on the processors 106 are experiencing coding errors or other like software faults. If, for example, the system template 206b provides for one or more intended or expected behaviors on the part of the anomalous redundant processing lane 104 or its components, the system response data 212b may indicate an absence of the intended behavior or the presence of some other unintended or unexpected behavior within the anomalous lane.

Figure 2C:
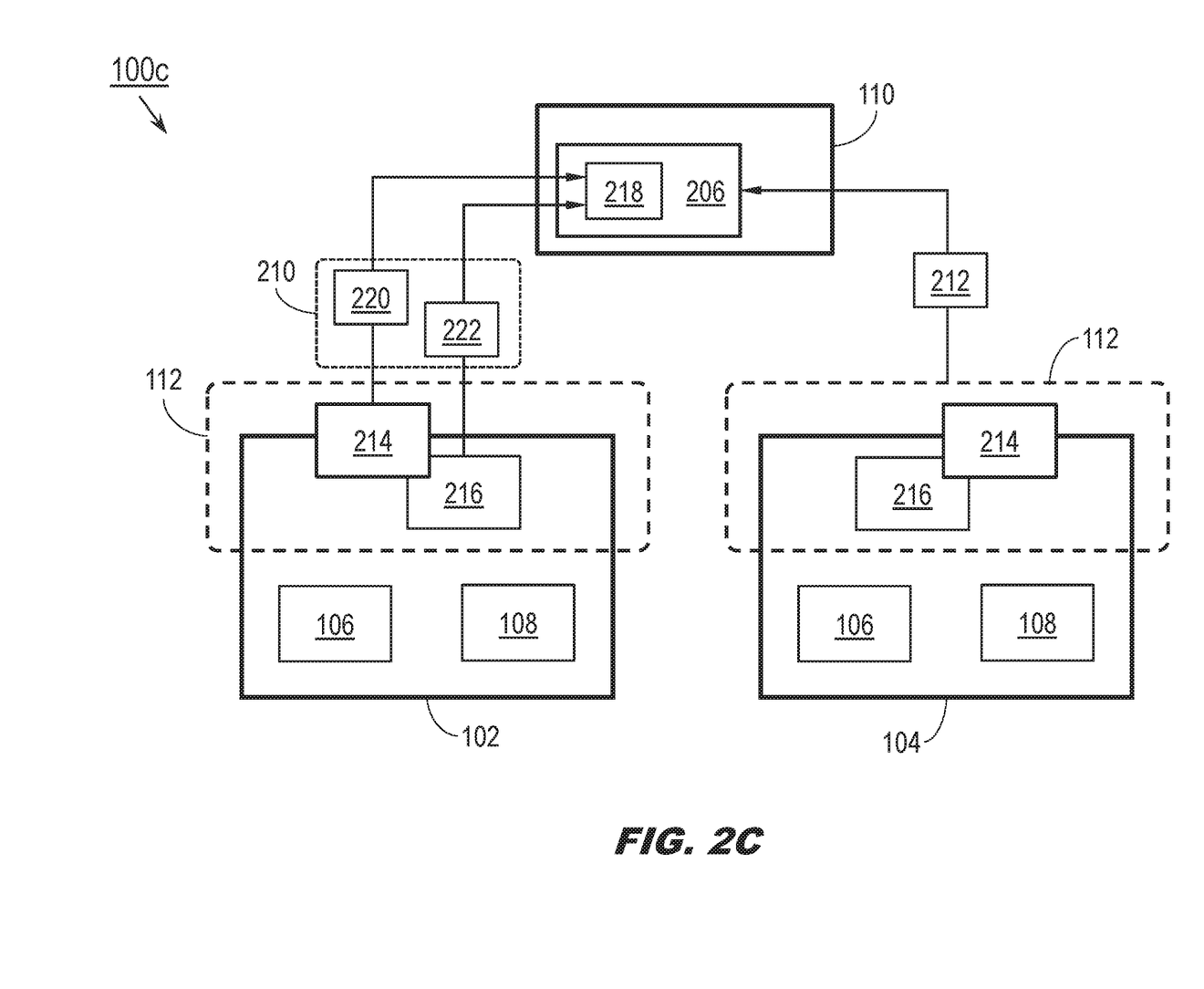

Referring to FIG. 2C, the redundant system 100c may be implemented and may function similarly to the redundant systems 100, 100a-b of FIGS. 1 through 2B, except that the redundant system 100c may operate in a "nonpriority" mode (as opposed to a "priority mode", e.g., as shown by in FIGS. 2A-B.

In embodiments, the redundant system 100c may operate in nonpriority mode if, for example, a discorrelation between system response data (210a-b, 212a-b; FIG. 2B) from the redundant processing lanes 102, 104 can be traced to a system failure or other anomaly within the monitoring sensors 112, as opposed to anomalous or unintended behavior on the part of the processors 106 or hardware components 108 (e.g., as may be identified when the redundant system is in priority mode, as shown by the redundant system 100b of FIG. 2B). For example, the monitoring sensors 112 of the redundant processing lane 102 may include primary sensors 214 and redundant sensors 216. Primary sensors 214 may include, e.g., side channel EM sensors (112a, FIG. 1), TDR probes (112b, FIG. 1), side channel MCI (112c, FIG. 1), or any other appropriate hardware monitoring sensor. Each primary sensor 214 may have an equivalent redundant sensor 216 for emulating the primary sensors. Accordingly, it is expected that any monitoring data collected by a redundant sensor 216 is equivalent to the monitoring data collected by the primary sensor 214.

In embodiments, the system templates 206 generated by the template processors 110 (e.g., when in the testing state) may include sensor templates 218 (e.g., sensor profiles) characterizing the expected behavior of each primary sensor 214. Accordingly, when the redundant system 100c is in an operational state, the system response data 210, 212 collected by the monitoring sensors 112 of the redundant processing lanes 102, 104 and correlated with the system templates 206 may include sensor response data 220, 222 collected respectively by the primary sensor 214 and its corresponding redundant sensor 216. The sensor response data 220, 222 may be correlated with the sensor templates 218 characteristic of the primary sensor 214. For example, a discorrelation between the system response data 210, 212 may be traced to a sensor discorrelation between the sensor response data 220, 222. If the sensor response data 220 collected by the primary sensor 214 deviates from the sensor template 218 while the sensor response data 222 collected by the redundant sensor 216 does not, the template processors 110 may conclude that the discorrelation between the sensor response data 220, 222 is due to system failure on the part of the primary sensor 214 rather than any anomalous or unexpected behavior on the part of the processors 106 or hardware components 108 of either redundant processing lane 102, 104.

Figure 2D:
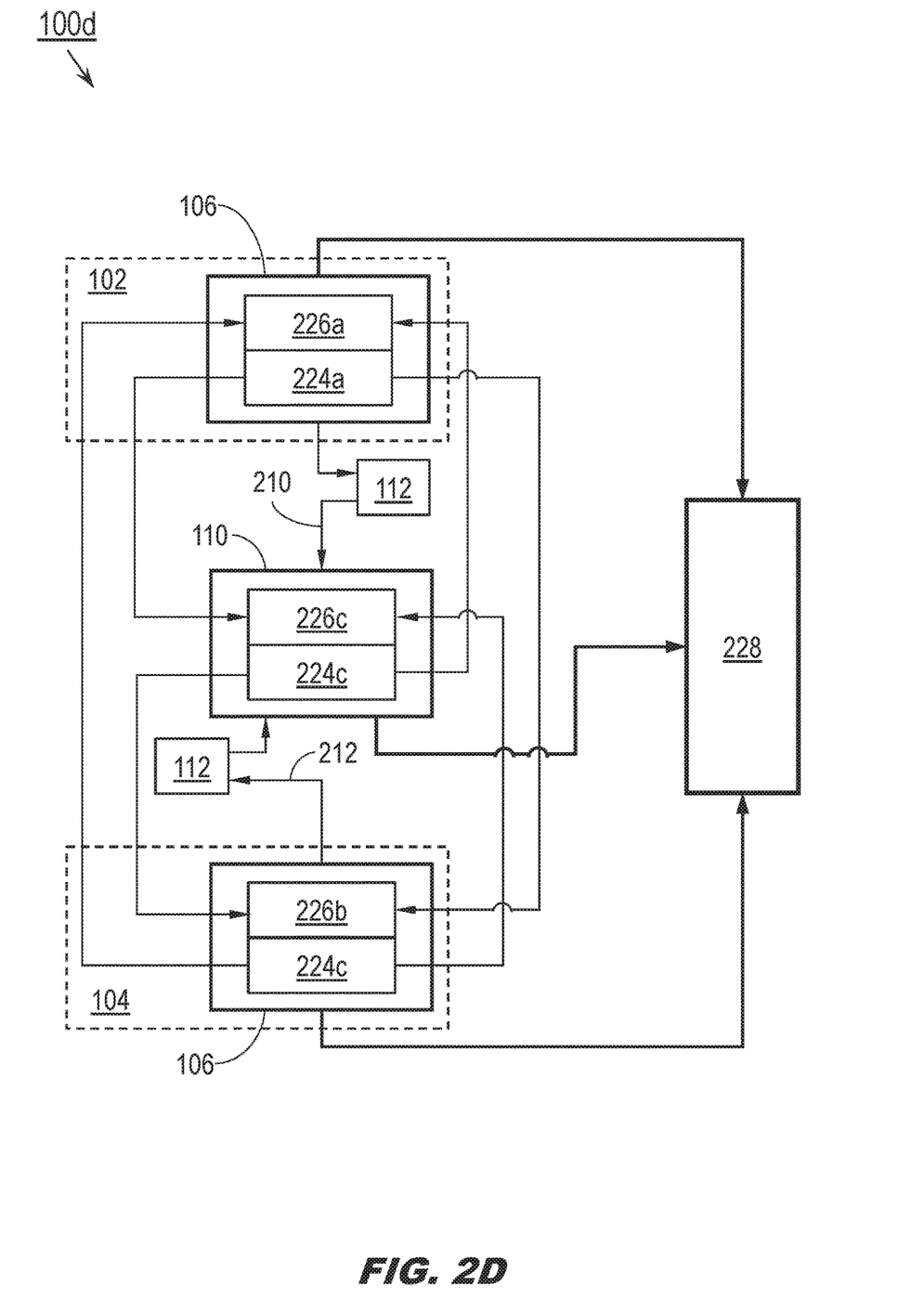

Referring to FIG. 2D, the redundant system 100d may be implemented and may function similarly to the redundant systems 100, 100a-c of FIGS. 1 through 2C, except that the redundant system 100d may resolve any conflict or disagreement between the redundant processing lanes 102, 104 and select commands for execution based on system response data 210, 212 or sensor response data (220, 222; FIG. 2C) collected by the hardware monitoring sensors 112.

In embodiments, the control processors 106 of each redundant processing lane 102, 104 may communicate with each other (224a, 224b) and vote (226a, 226b) which redundant processing lane sends commands for execution (228). For example, if the behavior and output of the redundant processing lanes 102, 104 is equivalent as expected, the selection 226a-b of a command for execution 228 may be trivial. However, in the event of discorrelation or disagreement between the redundant processing lanes 102, 104, the template processors 110 may attribute the disagreement to anomalous, unexpected, or erroneous behavior on the part of the redundant processing lane 104 (e.g., on the part of its control processors 106, its hardware components (108, FIG. 1) or on the part of one or more hardware monitoring sensors 112 in communication with the redundant processing lane 104. Accordingly, the template processors 110 may similarly communicate (224c) their conclusions to the redundant processing lanes 102, 104 and vote (226c) to exclude the anomalous redundant processing lane 104 in favor of the redundant processing lane 102, whose command will accordingly be submitted for execution (228) by the redundant system 100d. For example, even if the redundant processing lanes 102, 104 each vote (226a-b) in favor of their own respective commands, the template processors 110 may provide a third vote 226c to exclude the anomalous redundant processing lane 104.

Figure 3A:
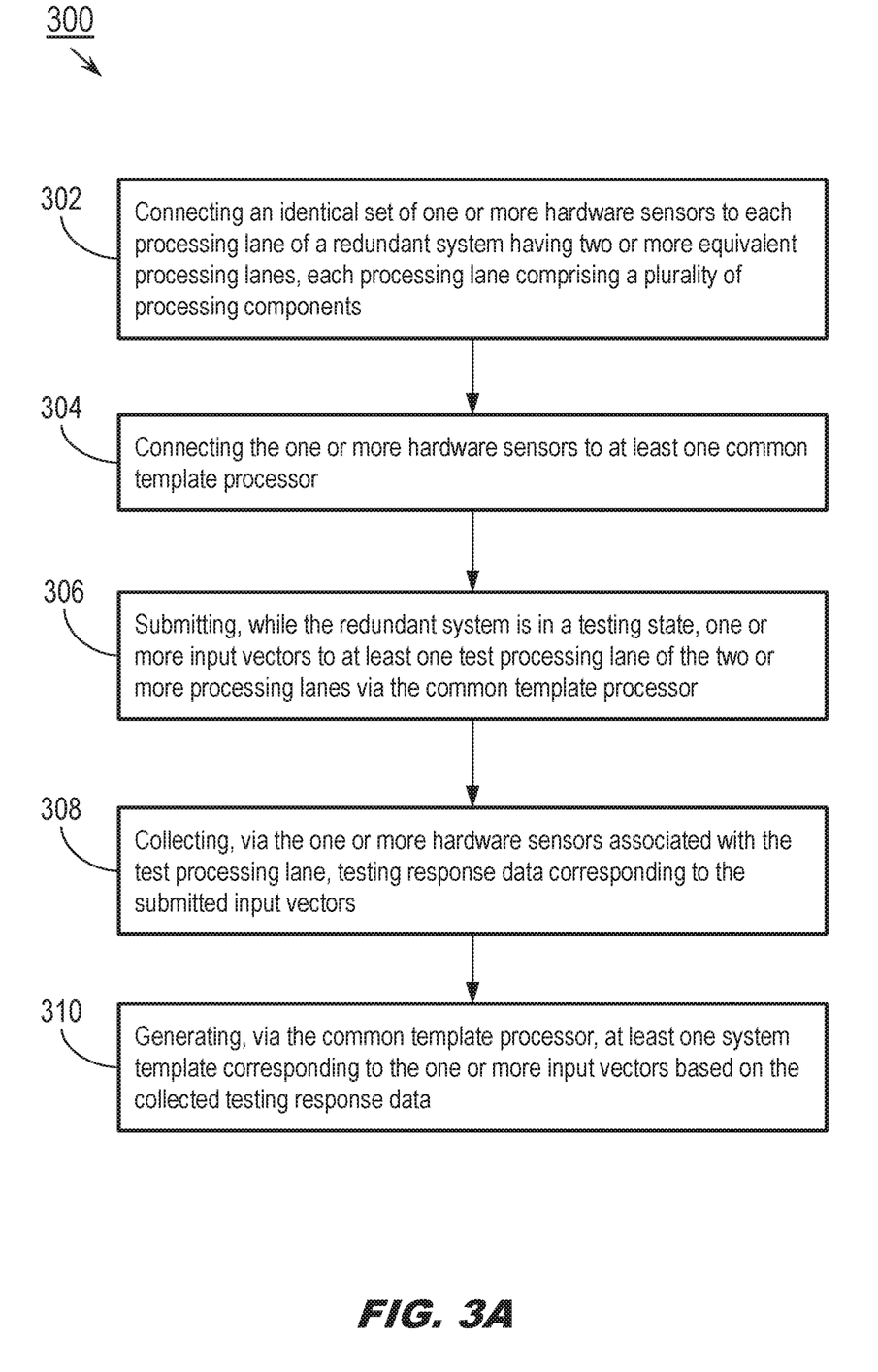
FIGS. 3A and 3B are flow diagrams illustrating a method for profile-based monitoring in accordance with example embodiments of this disclosure.
Figure 3B:
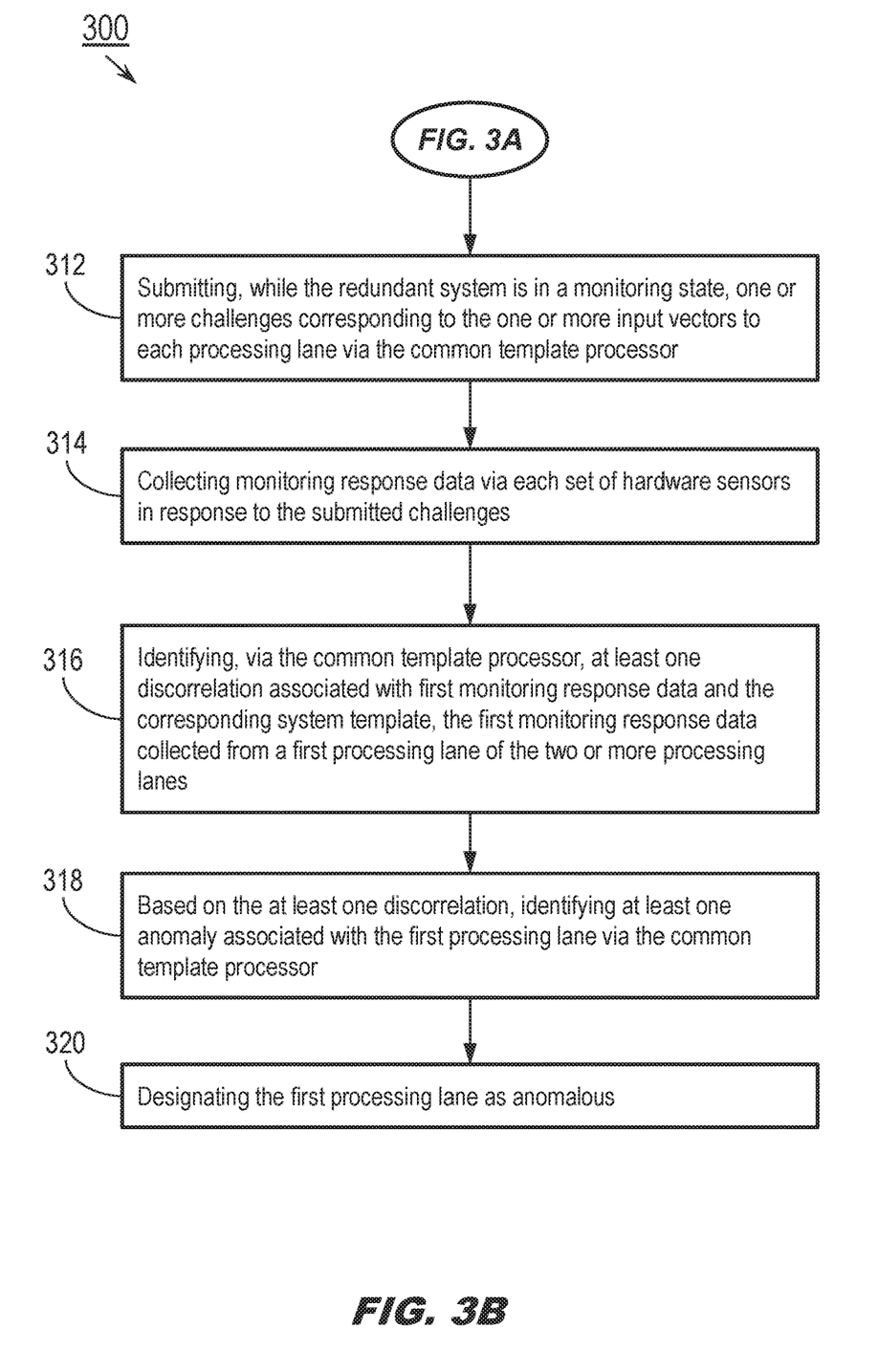

Referring to FIGS. 3A and 3B, the method 300 may be implemented by embodiments of the redundant system 100, 100a-d of FIGS. 1 through 2D and may include the following steps.

Referring to FIG. 3A, at a step 302 an identical set of hardware monitoring sensors is connected to each redundant processing lane of a redundant system having two or more such equivalent lanes, each processing lane comprising a plurality of like components. For example, each identical set of hardware monitoring sensors includes a primary hardware sensor and one or more redundant hardware sensors for emulating the primary hardware sensor (e.g., providing redundant or backup sensor data).

At a step 304, the identical sets of monitoring sensors are connected to common template processors.

At a step 306, while the redundant system is in a testing state or phase, the common template processors submit input vectors to a selected lane of the redundant system.

At a step 308, the set of monitoring sensors connected to the selected lane collects testing response data based on the submitted input vectors. For example, the primary sensors may collect primary testing response data, and the redundant sensors may collect secondary testing response data of expected equivalence to the primary testing response data.

At a step 310, the common template processors generate system templates based on each input vector or set thereof, as well as the corresponding testing response data collected by the monitoring sensors. For example, the system templates may include sensor templates specific to a particular primary sensor and based on its corresponding primary testing response data.

Referring to FIG. 3B, at a step 312, while the redundant system is in a monitoring or operational state, the common template processors submit one or more challenges corresponding to the submitted input vectors to each redundant processing lane.

At a step 314, each set of monitoring sensors collects monitoring response data characterizing the response of each redundant processing lane to the submitted challenges. For example, the primary sensors may generate primary monitoring response data and the redundant sensors may generate secondary monitoring response data of expected equivalent to the secondary monitoring response data.

At a step 316, the common template processors correlate the received monitoring response data with the corresponding system templates (e.g., the monitoring response data, the challenges resulting in the monitoring response data, and the system templates all based on common input vectors), identifying a discorrelation in the data received from a potentially anomalous processing lane. For example, the primary and secondary monitoring response data may be correlated with the sensor templates corresponding to the primary sensor.

At a step 318, based on the identified discorrelation, the common template processors may identify or detect system anomalies in the potentially anomalous processing lane. For example, if a given set of primary monitoring response data collected by a primary sensor deviates from the sensor template corresponding to that primary sensor, a sensor failure or sensor anomaly may be identified with respect to the primary sensor.

The method 300 may include an additional step 320. At the step 320, the common template processors designate the potentially anomalous processing lane as anomalous.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A redundant system with profile-based monitoring, comprising:
    a redundant processing environment having at least a testing state and a monitoring state and including at least two equivalent processing lanes, each processing lane comprising:
        one or more processing components;
        one or more applications configured to execute on the one or more processing components;
        and
        one or more hardware sensors configured to collect response data corresponding to the processing lane; and
    at least one template processor communicatively coupled to each processing lane by the one or more hardware sensors, the template processor configured to, while the processing environment is in the testing phase:
        submit at least one input vector to at least one test processing lane of the at least two processing lanes;
        receive testing response data corresponding to the submitted input vectors, the testing response data collected by the one or more hardware sensors corresponding to the at least one test processing lane; and
        generate at least one system template based on the submitted input vectors and the corresponding testing response data;
    the template processor configured to, while the processing environment is in the monitoring state:
        submit at least one challenge to each of the at least two processing lanes;
        receive operational response data corresponding to the submitted challenge and collected by the one or more hardware sensors;
        correlate the operational response data with the corresponding system template; and
        based on at least one discorrelation between the operational response data and the corresponding system template, identify at least one anomaly associated with the corresponding processing lane.

2. The redundant system of claim 1, wherein the template processor is configured to designate the corresponding processing lane as anomalous based on the at least one identified anomaly.

3. The redundant system of claim 1, wherein the at least one identified anomaly includes at least one of a local failure associated with at least one anomalous processing component of the first processing lane, identified malware associated with the anomalous processing component, or a software error associated with the one or more applications executing on the anomalous processing component.

4. The redundant system of claim 1, wherein:
the at least one system template includes at least one intended behavior associated with the anomalous processing component;
or
the corresponding set of operational response data includes at least one of an absence of the intended behavior and an unintended behavior associated with the anomalous processing component.

5. The redundant system of claim 1, wherein the template processor is configured to, when the processing environment is in the testing phase, verify that the at least one test processing lane is a trusted system.

6. The redundant system of claim 1, wherein:
the one or more hardware sensors include at least one of a primary sensor and a redundant sensor configured to emulate the primary sensor;
the testing response data includes primary testing response data collected by the primary sensor;
and
the template processors are configured to generate at least one sensor template corresponding to the primary sensor, the sensor template based on the submitted input vectors and the corresponding primary testing response data.

7. The redundant system of claim 6, wherein:
the operational response data includes at least one of primary operational response data collected by the primary sensor and secondary operational response data collected by the redundant sensor;
and
the template processors are configured to:
correlate at least one of the primary operational response data and the secondary operational response data with the corresponding sensor template;
based on at least one discorrelation between the corresponding sensor template and the primary operational response data, identify at least one primary sensor anomaly associated with the primary sensor;
and
based on at least one discorrelation between the corresponding sensor template and the secondary operational response data, identify at least one secondary sensor anomaly associated with the redundant sensor.

8. The redundant system of claim 1, wherein the one or more hardware sensors include at least one of a side-channel electromagnetic (EM) emanation sensor, a side-channel magnetic current imager, or a time-domain reflectometry (TDR) probe to each processing lane of a redundant system having two or more equivalent processing lanes.

9. The redundant system of claim 2, wherein:
the at least two processing lanes are configured for collective selection of at least one command for execution by the redundant system from at least two candidate commands corresponding to the at least two processing lanes;
and
the at least one template processor is configured to recommend to the at least two processing lanes exclusion from the selection of the at least one candidate command corresponding to the anomalous processing lane.

10. A method for profile-based monitoring, the method comprising:
connecting an identical set of one or more hardware sensors to each processing lane of a redundant system having two or more equivalent processing lanes, each processing lane comprising a plurality of processing components;
connecting the one or more hardware sensors to at least one common template processor;
submitting, while the redundant system is in a testing state, one or more input vectors to at least one test processing lane of the two or more processing lanes via the common template processor;
collecting, via the one or more hardware sensors associated with the test processing lane, testing response data corresponding to the submitted input vectors;
generating, via the common template processor, at least one system template corresponding to the one or more input vectors based on the collected testing response data;
submitting, while the redundant system is in a monitoring state, one or more challenges to each processing lane via the common template processor;
collecting monitoring response data via each set of hardware sensors in response to the submitted challenges;
identifying, via the common template processor, at least one discorrelation associated with first monitoring response data and the corresponding system template, the first monitoring response data collected from a first processing lane of the two or more processing lanes;
and
based on the at least one discorrelation, identifying at least one anomaly associated with the first processing lane via the common template processor.

11. The method of claim 10, further comprising:
designating the first processing lane as anomalous.

12. The method of claim 10, wherein based on the at least one discorrelation, identifying at least one anomaly associated with the first processing lane via the common template processor includes:
based on the at least one discorrelation, identifying at least one of a local failure associated with at least one anomalous processing component of the first processing lane, identified malware associated with the anomalous processing component, or a software error associated with the one or more applications executing on the anomalous processing component.

13. The method of claim 10, wherein:
collecting, via the set of hardware sensors associated with the test processing lane, testing response data corresponding to the submitted input vectors includes sensing, via the set of hardware sensors, at least one intended behavior associated with the at least one anomalous processing component;
and
collecting at least one set of monitoring response data via each set of hardware sensors in response to the submitted challenges includes sensing, via the set of hardware sensors, at least one of an absence of the intended behavior or an unintended behavior associated with the at least one anomalous processing component.

14. The method of claim 10, wherein submitting, while the redundant system is in a testing state, one or more input vectors to at least one test processing lane of the two or more processing lanes via the common template processor includes:

verifying that the at least one test processing lane is a trusted system.

15. The method of claim 10, wherein connecting an identical set of hardware sensors to each processing lane of a redundant system having two or more equivalent processing lanes, each processing lane comprising a plurality of processing components, includes:

connecting at least one of a side-channel electromagnetic (EM) emanation sensor, a side-channel magnetic current imager, or a time-domain reflectometry (TDR) probe to each processing lane of a redundant system having two or more equivalent processing lanes.

16. The method of claim 10, wherein:

connecting the one or more hardware sensors to at least one common template processor includes connecting to the common template processor at least one of a primary sensor and a redundant sensor configured to emulate the primary sensor;

collecting, via the one or more hardware sensors associated with the test processing lane, testing response data corresponding to the submitted input vectors includes collecting primary testing response data via the primary sensor;

generating, via the common template processor, at least one system template corresponding to the one or more input vectors based on the collected testing response data includes generating at least one sensor template corresponding to the primary sensor based on the collected primary testing response data;

and collecting at least one set of monitoring response data via each set of hardware sensors in response to the submitted challenges includes collecting primary monitoring response data via the primary sensor and secondary monitoring response data via the redundant sensor.

17. The method of claim 16, wherein:

identifying, via the common template processor, at least one discorrelation associated with first monitoring response data and the corresponding system template, the first monitoring response data collected from a first processing lane of the two or more processing lanes includes identifying at least one of:
1) a divergence between the primary monitoring response data and the secondary monitoring response data; or
2) a sensor discorrelation between the sensor template corresponding to the primary sensor and at least one of the primary monitoring response data or the secondary monitoring response data;

and based on the at least one discorrelation, identifying at least one anomaly associated with the first processing lane via the common template processor includes identifying at least one sensor anomaly corresponding to at least one of the primary sensor or the redundant sensor.

18. The method of claim 11, further comprising:

recommending to the two or more processing lanes, via the at least one common template processor, exclusion from execution of at least one command corresponding to the anomalous first processing lane.

\* \* \* \* \*